United States Patent Office 3,615,139
Patented Oct. 26, 1971

3,615,139
ARRANGEMENT FOR PHOTOELECTRIC
DIMENSION MEASURING
Lars-Åke Boström, Huddinge, Sweden, assignor to
Telefonaktiebolaget L M Ericsson, Stockholm, Sweden
Filed Dec. 4, 1968, Ser. No. 781,026
Claims priority, application Sweden, Dec. 7, 1967,
16,806/67
Int. Cl. G06b 11/02, 11/10
U.S. Cl. 356—160   4 Claims

ABSTRACT OF THE DISCLOSURE

Photo-electrical measuring apparatus generates a light beam which passes across the gap of two rotating wheels while being parallel to the common axis of the wheels. The object whose dimension is to be measured passes through the gap. As the wheels rotate electric pulses are generated at rate of a given number per unit distance. These pulses are counted whenever the beam is blocked by the object.

---

The present invention refers to an arrangement for photoelectrically measuring the dimensions of passing objects, such as timber.

Several such arrangements are known. One arrangement comprises means for generating a light spot which moves across one side of an object while a photo-electric cell, placed on the other side of the object registers light variations, when the light spot passes the contours of the object. In order to decrease the convergence of the light beams which reach the photo-electric cell from the contours of the object and thereby make the accuracy of measurement practically independent of the size of the object, the photo-electric cells must be placed at a large distance from the object. This is attained by placing the photo-electric cell on a pillar at the side of the object to be measured. However, such an arrangement will be bulky, and will require a very stable base plate of large size.

Another known arrangement comprises a parabolic mirror which is illuminated by an elongated light source placed at a distance from the parabolic mirror. The object to be measured is introduced between the light source and the parabolic mirror, shadowing a part of the mirror. In the focus of the mirror there is arranged a rotating photo-electric cell to detect how much of one rotation corresponds to the extension of the shadow on the parabolic mirror. By means of pulses from a pulse generator, working synchronously with the rotating photo-electric cell, the dimension of the object can in a known way be calculated. For attaining a good accuracy of measurement it is required that the beams coming from the elongated light source should be parallel so that the shadow of the object to be measured will be sharply limited. It is also required that the parabolic mirror should be of high quality.

An object of the invention is to eliminate these disadvantages of the known arrangements. The invention contemplates a light beam emitted by a light source, placed on one side of the object, and arranged to move parallelly between two limit positions of a measuring area. When the beam falls outside the contours of the object, a photo-electric cell placed on the opposite side of the object is illuminated. A pulse generator working synchronously with the movement of the light beam and arranged to generate a certain number of pulses per length unit feeds a pulse counter under the control of the photoelectric cell.

Figure 1:
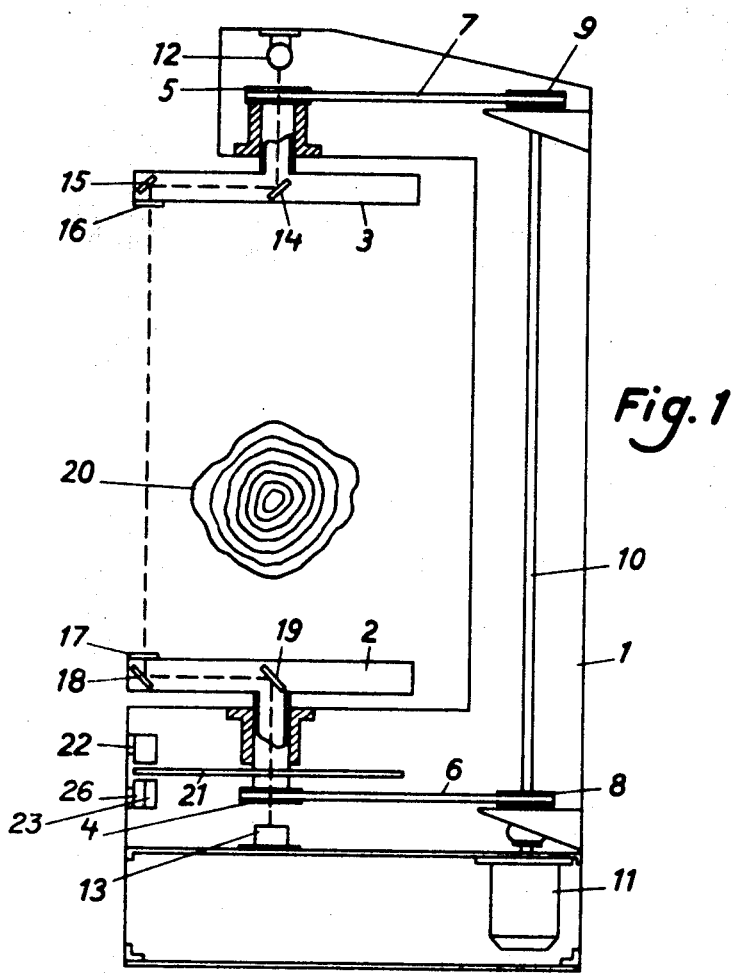
Figure 2:
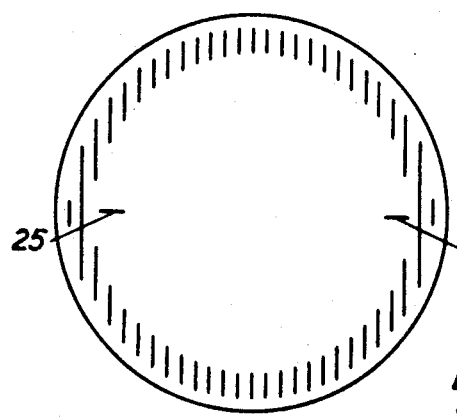
Figure 3:
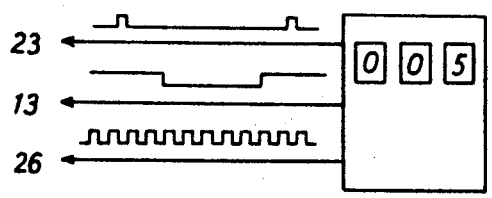

An embodiment of the arrangement according to the invention will be described below with reference to the accompanying drawing, in which FIG. 1 by a sectional view schematically shows the construction of the arrangement, FIG. 2 shows the design of a screen plate by means of which pulses are generated that correspond to the movement of the light beam, and FIG. 3 shows the counting apparatus receiving input pulses.

The embodiment shown in FIG. 1 comprises a stand 1 which supports two drum wheels 2 and 3, each consisting of a low hollow cylinder with plane ends. The drum wheels have coaxially aligned tubular axles arranged to be driven synchronously by means of chain belts 6 and 7, from a through shaft 10 mounted on a stand. References 4 and 5 denote cog wheels arranged on the drum wheel axles and the references 8 and 9 denote the corresponding cog wheel on the shaft 10. Shaft 10 is directly connected to an electric motor 11. Inside the drum wheels mirrors are placed in such a manner that a light beam coming from the lamp 12 on top of the stand will follow a path indicated in the drawing by dashed lines to the photo-electric cell 13 in the bottom of the stand. In particular from the lamp 12 the light beam follows the center line in the axle of the drum wheel 3, is reflected at a right angle by the mirror 14 radially to the mirror 15 in the periphery of the wheel. Mirror 16 then reflects the beam by a right angle through the window 16 and window 17 to the mirror 18 in the lower drum wheel 2. The light beam is reflected by the mirror 18 at a right angle to the center of the wheel 2 to be reflected finally by the mirror 19 through the hollow wheel axle to the photo-electric cell 13. When the wheels rotate the light ray will move parallelly along a circular orbit. Reference character 20 denotes the cross section of an object whose diameter is to be measured and which is brought to pass between the drum wheels 2 and 3. The variations of the illumination of the photo-electric cell 13 which occur when the beam passes the contour lines of the objects, cause corresponding variations in a current flowing through the photo-electric cell 13. These variations are arranged to start and stop, respectively, in a known way, an electronic equipment, FIG. 3, which is supplied with pulses from a pulse generator working in such a manner that the number of generated pulses correspond to the motion of the beam in the measuring direction. The pulse generator comprises a screen plate 21 arranged on the axle of the lower drum wheel. The screen plate rotates synchronously with the light beam. The screen plate has an edge provided with through slots which passes between a light source 22 and a pair of photo cells 23, 26 arranged on a common casing. As shown in FIG. 2 the slots in the edge of the screen plate are mutually parallel and are separated by a constant distance from each other, e.g. ⅛ inch, whereby the number of pulses generated by the photo-electric cell 26 when it is illuminated through the slots, corresponds directly to the motion component of the light beam in the measuring direction. The pulses generated by the photo-electric cell 23, when it is illuminated through the slots 24 and 25, are used for the zero-setting, the connecting and the disconnecting of the electronic counting equipment.

FIG. 3 shows the electronic counting equipment connected to the photo-electric cells 23, 13 and 26. The pulses with which the equipment is fed are shown above the connection conductors. The photo-electric cell 26 generates pulses which correspond to the motion of the light beam, and of these pulses those are counted which are generated when the photo-electric cell 13 is shadowed by the object to be measured. To prevent pulses from being counted more than once, pulses from the photo-electric cell 23 are used for electronic interruption of the connection between the photo-electric cell 26 and the equipment.

An advantage of the described embodiment of the invention is that litter, bark pieces, twigs and so on, which may fall off the object to be measured and down on the measuring arrangement do not interrupt the beam. In the present invention the litter firstly falls on the lower wheel, where it is hurled away by centrifugal force. In known arrangements a control takes place each time that an object to be measured has passed the measuring arrangement. If the counting is faulty there then takes place automatic cleaning of the measuring equipment by means of compressed air. The present invention eliminates the need for a control- and compressed-air cleaning equipment.

I claim:

1. Apparatus for optically measuring a dimension of an object comprising means for generating a beam of light which has a portion of its path along a revolving line that is the generatrix of a circular cylinder and moves across the object, means for sensing the start and end of a interruption of said portion of said beam of light by the object, means for generating pulse signals whose frequency is linearly related to a constant speed of movement along a diameter of the cylinder, and means for counting the number of pulse signals occurring between the start and the end of an interruption of said portion of said beam of light by the object.

2. The apparatus of claim 1 wherein said pulse signal generating means comprises a light source and a phototransducer, a circular plate interposed between said light source and said phototransducer, said circular plate having a plurality of straight-line openings about its periphery, each of said openings being parallel to a common diameter of said circular plate and separated from each other by the same distance, and means for rotating said circular plate coaxially with the axis of said circular cylinder.

3. The apparatus of claim 2 wherein said means for generating the beam of light comprises first and second coaxially rotatable members which are axially separated for straddling the object, means for synchronously rotating said members about their common axis of rotation, light transmitting means associated with one of said members for transmitting a light beam from said one member along a path parallel to the common axis of rotation to the other of said members, and light receiving means associated with said other member for receiving the light beam transmitted by said light transmitting means, said sensing means being responsive to said receiving means.

4. The apparatus of claim 3 wherein said rotatable members are wheels.

References Cited

UNITED STATES PATENTS

| | | | |
|---|---|---|---|
| 2,488,430 | 1/1949 | Offner | 250—236 |
| 2,514,985 | 7/1950 | Banner | 250—219 WD |
| 2,873,381 | 2/1959 | Lauroesch | 250—236 |
| 3,017,801 | 1/1962 | Ingber | 250—219 WD |
| 3,362,284 | 1/1968 | Patrignani | 356—167 |
| 3,436,556 | 4/1969 | McCartney | 356—167 |
| 3,480,141 | 11/1969 | Rock, Jr. | 356—156 |
| 3,024,986 | 3/1962 | Strianese et al. | 356—170 |
| 3,187,187 | 6/1965 | Wingate | 356—150 |

FOREIGN PATENTS

| | | | |
|---|---|---|---|
| 770,920 | 1957 | Great Britain | 356—152 |
| 1,041,127 | 9/1966 | Great Britain | 250—219 WD |

RONALD L. WIBERT, Primary Examiner

J. ROTHENBERG, Assistant Examiner

U.S. Cl. X.R.

250—219 WD, 224, 236; 356—167